United States Patent
Nojiri et al.

(10) Patent No.: US 10,093,160 B2
(45) Date of Patent: Oct. 9, 2018

(54) OPENING TRIM WEATHER STRIP

(71) Applicant: TOYODA GOSEI CO., LTD., Kiyosu-shi, Aichi-ken (JP)

(72) Inventors: Masatoshi Nojiri, Kiyosu (JP); Hirofumi Otsuka, Kiyosu (JP); Hiroshi Sobue, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/237,786

(22) Filed: Aug. 16, 2016

(65) Prior Publication Data
US 2017/0050504 A1    Feb. 23, 2017

(30) Foreign Application Priority Data
Aug. 20, 2015   (JP) .................. 2015-162522

(51) Int. Cl.
*B60J 10/248*   (2016.01)
*B60J 10/32*    (2016.01)
*B60J 10/84*    (2016.01)

(52) U.S. Cl.
CPC ............ *B60J 10/248* (2016.02); *B60J 10/32* (2016.02); *B60J 10/84* (2016.02)

(58) Field of Classification Search
CPC .......... B60J 10/248; B60J 10/32; B60J 10/84
USPC ..................................... 296/146.9
See application file for complete search history.

(56) References Cited

U.S. PATENT DOCUMENTS

| | | |
|---|---|---|
| 7,281,354 B2 | 10/2007 | Nishihara |
| 2002/0136850 A1 | 9/2002 | Ikuta |
| 2008/0178532 A1 | 7/2008 | Leung |
| 2008/0229670 A1 | 9/2008 | Iwasa et al. |

(Continued)

FOREIGN PATENT DOCUMENTS

| | | |
|---|---|---|
| EP | 1 123 827 A1 | 8/2001 |
| GB | 2 296 522 A | 7/1996 |

(Continued)

OTHER PUBLICATIONS printout from ProQuest for Jp 57117218 U stating the publication date of the references (Year: 2018).*

(Continued)

*Primary Examiner* — Hilary L Gutman
(74) *Attorney, Agent, or Firm* — POSZ LAW GROUP, PLC (57) ABSTRACT

An opening trim weather strip includes an attaching base portion and a hollow seal portion. The hollow seal portion is formed to be divided into a first hollow portion and a second hollow portion. The first hollow portion includes a first outer peripheral sidewall extending from an opening end of a vehicle outside sidewall of the attaching base portion, the hollow seal portion connection wall, a first inner peripheral sidewall, and the vehicle outside sidewall. The second hollow portion includes a second outer peripheral sidewall and a second inner peripheral sidewall. A connector between the first outer peripheral sidewall and the second outer peripheral sidewall forms a hollow seal portion bent portion, and an outer surface of the hollow seal portion bent portion is formed to be positioned in the inner peripheral direction of the vehicle body opening peripheral edge than the tip portion of the second hollow portion.

6 Claims, 4 Drawing Sheets

(56) References Cited

U.S. PATENT DOCUMENTS

2012/0031009 A1  2/2012  Iwasa et al.
2014/0157679 A1  6/2014  Lee
2014/0290143 A1  10/2014 Yamada et al.

FOREIGN PATENT DOCUMENTS

| GB | 2 407 119 A | 4/2005 |
|----|-------------|--------|
| JP | 57-117218 | 7/1982 |
| JP | 2005-119350 A | 5/2005 |
| JP | 2006-069493 A | 3/2006 |
| JP | 2011-189880 A | 9/2011 |
| JP | 2011-201544 A | 10/2011 |
| JP | 2014-196052 A | 10/2014 |

OTHER PUBLICATIONS

Office Action dated Jan. 12, 2017 issued in corresponding GB patent application No. GB1614151.7.
Japanese Office Action dated Jun. 12, 2018 issued in corresponding JP patent application No. 2015-162522(with English translation).

* cited by examiner

OPENING TRIM WEATHER STRIP

CROSS-REFERENCE TO RELATED APPLICATION(S)

This application is based upon and claims the benefit of priority from Japanese Patent Application No. 2015-162522, filed on Aug. 20, 2015, the entire contents of which are incorporated herein by reference.

BACKGROUND

1. Field of the Invention

The present invention relates to an opening trim weather strip for a vehicle which seals a gap between a vehicle door and a vehicle body opening peripheral edge.

2. Description of the Related Art

Figure 3:
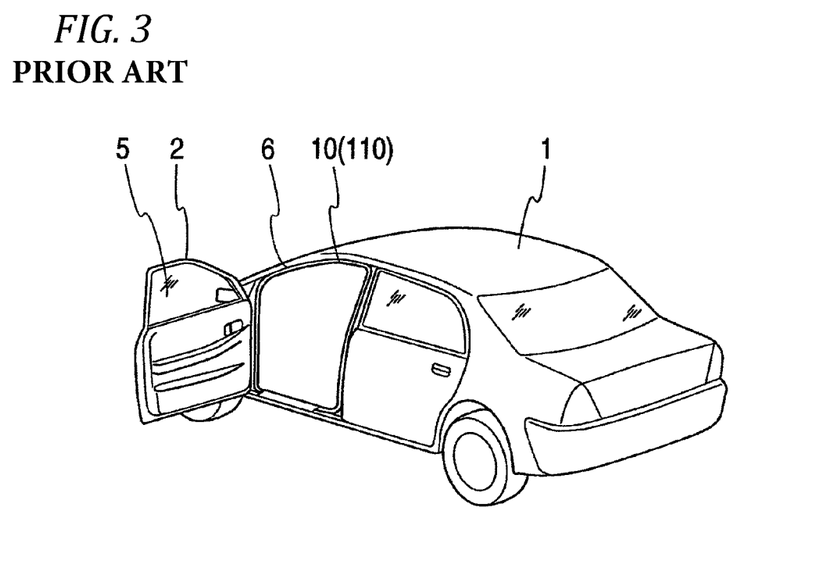
FIG. 3 is a perspective view when viewed from a rear side, illustrating a state where a vehicle door is opened.

In the related art, as illustrated in FIG. 3, sealing a gap between a vehicle door and a vehicle body opening peripheral edge is made by a glass run (not illustrated) attached to a channel (not illustrated) of an inner periphery of a door frame 2 of the door, a door weather strip (not illustrated) attached in the vicinity of an opening of a vehicle body opening peripheral edge 6, and an opening trim weather strip 110 (to be described below) attached to a flange 7 of the vehicle body opening peripheral edge 6.

Figure 4:
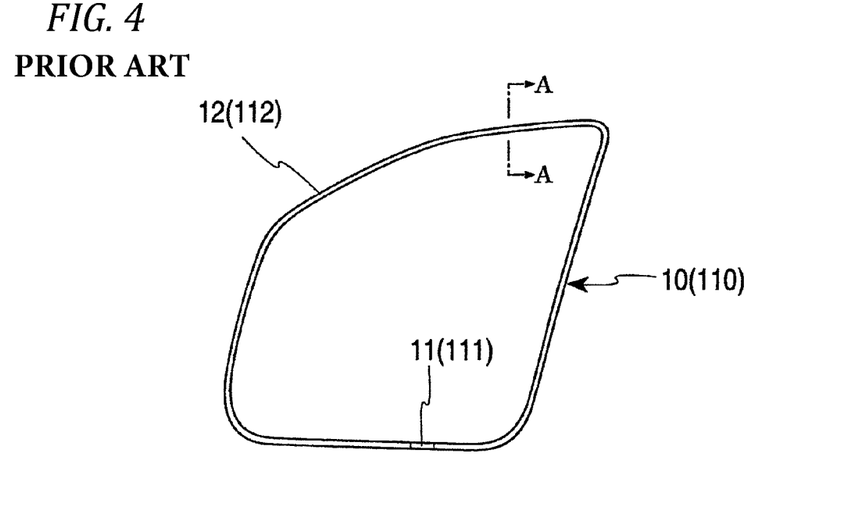
FIG. 4 is a front view illustrating a door opening trim weather strip according to the embodiment of the present invention.
Figure 5:
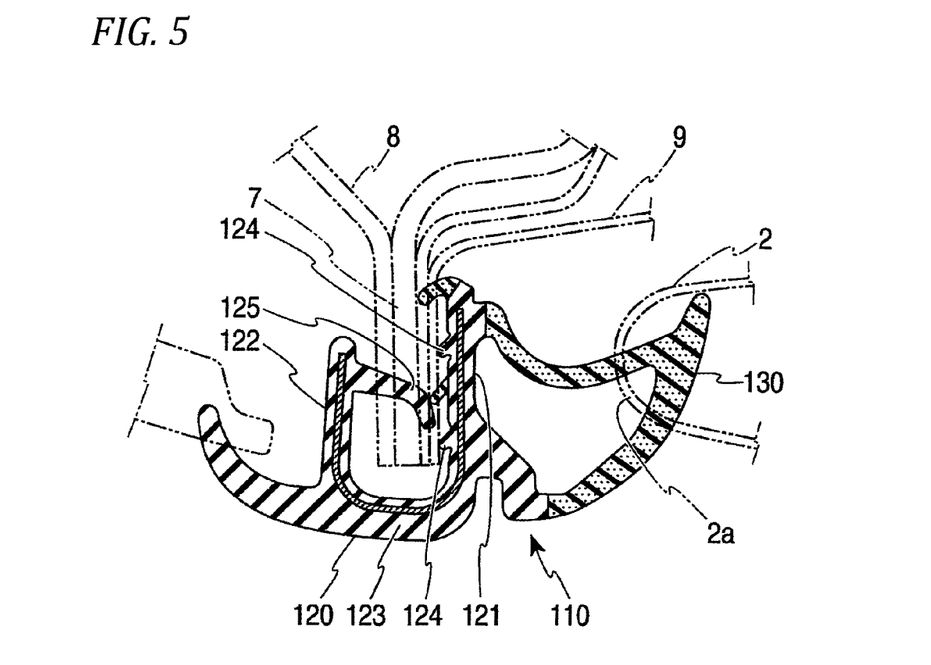
FIG. 5 is a sectional view illustrating a state where a door opening trim weather strip in the related art is attached to a vehicle opening peripheral edge.

As illustrated in FIGS. 3 and 4, the opening trim weather strip 110 is formed as one unit by extrusion molding, the ends thereof are connected by a connector 111 to form an annular shape, and the opening trim weather strip 110 is attached to the substantially entire periphery of the vehicle body opening peripheral edge 6 of the vehicle body. Thus, when the door is closed, the opening trim weather strip 110 abuts on the door frame 2 or the outer periphery of a door panel so that the sealing is made. As illustrated in FIG. 5, the flange 7 is provided in the vehicle body opening peripheral edge 6, the opening trim weather strip 110 is attached to the flange 7, and the flange 7 is formed by fixedly welding the tips of an inner panel 8 and an outer panel 9.

As illustrated in FIG. 5, the opening trim weather strip 110 includes a hollow seal portion 130 and an attaching base portion (trim portion) 120 of a substantially U shape in cross section, and is attached to the flange 7 through the attaching base portion (trim portion) 120. The trim portion 120 is formed by a vehicle outside sidewall 121, a vehicle inside sidewall 122, and a bottom wall 123 in a substantially U shape in cross section (for example, see JP-A-2011-189880).

As illustrated in FIG. 5, a vehicle outside holding lip 124 and a vehicle inside holding lip 125 are formed on the respective inner surfaces, which have a substantially U shape in cross section, of the vehicle outside sidewall 121 and the vehicle inside sidewall 122 so as to grip the flange 7. When the flange 7 is inserted to the trim portion 120, the tips of the vehicle outside holding lip 124 and the vehicle inside holding lip 125 are bent and press the respective side surfaces of the flange 7 to hold the flange 7, whereby the opening trim weather strip 110 can be attached. A door frame protrusion 2a of the door frame 2 abuts on the hollow seal portion 130 so that the sealing is made.

Figure 6:
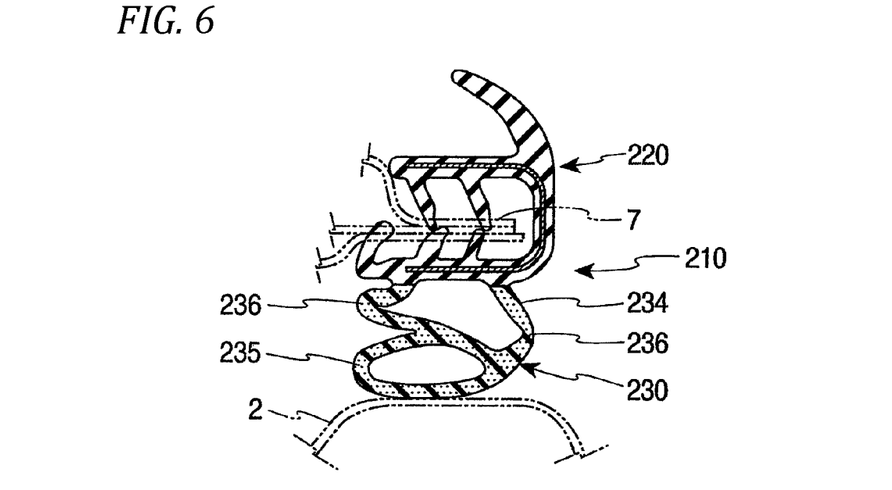
FIG. 6 is a sectional view illustrating a state where another door opening trim weather strip in the related art is attached to the vehicle opening peripheral edge.

As illustrated in FIG. 6, there is a technique in which an opening trim weather strip 210 has a trim portion 220 attached to the flange 7, and a hollow seal portion 230 formed by two hollow portions of a hollow root portion 234 and a hollow extending portion 235 (for example, see JP-A-2005-119350). In this case, bending portions 236 and 236 are provided in a sealing wall of the hollow root portion 234 of the hollow seal portion 230 to reduce a door closing force and ensure a sealability.

However, when a swing door with a narrow gap between the door and the vehicle body opening peripheral edge 6 has a sealing structure of pushing and crushing the entire hollow root portion 234 and hollow extending portion 235 instead of pushing down the hollow extending portion 235, the side walls of the hollow seal portion 230 are overlapped in a triple manner to generate a bottom touch of a deformation in some variation of dimension between the door and the vehicle body opening peripheral edge 6, thereby rapidly increasing a closing load of the door.

SUMMARY

The invention is to provide an opening trim weather strip for a vehicle in which a door closing force in closing a door is reduced, and a sealing surface pressure is ensured so that a sealability can be ensured.

According to a first aspect of the invention, there is provided an opening trim weather strip which is attached to a flange formed to surround a vehicle body opening peripheral edge of a vehicle and seals a gap between a vehicle door and the vehicle body opening peripheral edge, including: an attaching base portion attached to the flange; and a hollow seal portion which is integrally provided to the attaching base portion and abuts on a door frame of the vehicle door or a door panel to seal the gap between the vehicle door and the vehicle body opening peripheral edge, wherein: the hollow seal portion is formed to be divided into a first hollow portion extending from the attaching base portion and a second hollow portion abutting on the door frame or an outer periphery of the door panel by a hollow seal portion connection wall; the first hollow portion includes a first outer peripheral sidewall obliquely extending from an opening end of a vehicle outside sidewall of the attaching base portion in a vehicle outside direction and in an inner peripheral direction of the vehicle body opening peripheral edge, the hollow seal portion connection wall extending in an extending direction of the first outer peripheral sidewall, a first inner peripheral sidewall connected from a bottom wall side of the vehicle outside sidewall of the attaching base portion to a tip of the hollow seal portion connection wall, and the vehicle outside sidewall of the attaching base portion; the second hollow portion includes a second outer peripheral sidewall extending from a connector between the first outer peripheral sidewall and the hollow seal portion connection wall to an outer peripheral side of the vehicle body opening peripheral edge, and a second inner peripheral sidewall formed to be positioned from a connector between the first inner peripheral sidewall and the hollow seal portion connection wall in an inner peripheral direction of the second outer peripheral sidewall, and tips of the second outer peripheral sidewall and the second inner peripheral sidewall are connected to each other to form a tip portion of the second hollow portion; and a connector between the first outer peripheral sidewall and the second outer peripheral sidewall forms a hollow seal portion bent portion, and an outer surface of the hollow seal portion bent portion is formed to be positioned in the inner peripheral direction of the vehicle body opening peripheral edge than the tip portion of the second hollow portion.

According to the first aspect of the invention, the opening trim weather strip includes the attaching base portion attached to the flange, and the hollow seal portion which is integrally provided to the attaching base portion and abuts on the door frame of the vehicle door or the outer periphery of the door panel to seal the gap between the vehicle door and the vehicle body opening peripheral edge. For this reason, when the attaching base portion is attached to the flange, the hollow seal portion abuts on the door frame or the outer periphery of the door panel, whereby the sealing can be made in the gap between the door frame or the outer periphery of the door panel and the vehicle body opening peripheral edge. The hollow seal portion is formed in a hollow shape to reliably abut on a wide portion of the door frame protrusion in a smooth manner even when an assembly variation of the door occurs, whereby the sealability can be ensured.

The hollow seal portion is formed to be divided into the first hollow portion extending from the attaching base portion and the second hollow portion abutting on the door frame or the outer periphery of the door panel by the hollow seal portion connection wall. For this reason, the first hollow portion and the second hollow portion can be formed in different deformation rigidity so that the second hollow portion abuts on the door frame or the outer periphery of the door panel at a predetermined surface pressure, whereby the sealability can be ensured.

The first hollow portion includes the first outer peripheral sidewall obliquely extending from the opening end of the vehicle outside sidewall of the attaching base portion in the vehicle outside direction and in the inner peripheral direction of the vehicle body opening peripheral edge, the hollow seal portion connection wall extending in the extending direction of the first outer peripheral sidewall, the first inner peripheral sidewall connected from the bottom wall side of the vehicle outside sidewall of the attaching base portion to the tip of the hollow seal portion connection wall, and the vehicle outside sidewall of the attaching base portion. For this reason, when the first hollow portion abuts on the door frame or the door panel, the connector between the first outer peripheral sidewall of the first hollow portion and the hollow seal portion connection wall is positioned far from the vehicle outside sidewall connection surface. Therefore, a bending can be easily made, and a door closing force can be reduced.

The second hollow portion includes the second outer peripheral sidewall extending from the connector between the first outer peripheral sidewall and the hollow seal portion connection wall to the outer peripheral side of the vehicle body opening peripheral edge, and the second inner peripheral sidewall formed to be positioned from the connector between the first inner peripheral sidewall and the hollow seal portion connection wall in the inner peripheral direction of the second outer peripheral sidewall, and the tips of the second outer peripheral sidewall and the second inner peripheral sidewall are connected to each other to form the tip portion of the second hollow portion. For this reason, when the second hollow portion abuts on the door frame or the door panel, the second hollow portion has the deformation resistance so that the sealing surface pressure is ensured, whereby the sealability can be improved.

The connector between the first outer peripheral sidewall and the second outer peripheral sidewall forms the hollow seal portion bent portion, and the hollow seal portion bent portion is formed to be positioned in the inner peripheral direction of the vehicle body opening peripheral edge than the tip portion of the second hollow portion. For this reason, the hollow seal portion is bent in the hollow seal portion bent portion at the time of closing the door, whereby the door closing force is reduced. The tip of the second hollow portion abuts on the door frame or the door panel in a linear seal manner, whereby the sealability can be improved.

A second aspect of the invention provides the opening trim weather strip according to the first aspect, wherein when the door frame of the vehicle door or the door panel abuts on the hollow seal portion, a distance between the door frame of the vehicle door or a tip of the outer periphery of the door panel and a connection surface between the first outer peripheral sidewall and the vehicle outside sidewall is formed in a length of 1.2 to 2.5 times a total wall thickness of the first outer peripheral sidewall, the second outer peripheral sidewall, and the second inner peripheral sidewall.

According to the second aspect of the invention, when the door frame of the vehicle door or the door panel abuts on the hollow seal portion, the distance between the door frame of the vehicle door or the tip of the outer periphery of the door panel and the connection surface between the first outer peripheral sidewall and the vehicle outside sidewall is formed in a length of 1.2 to 2.5 times the total wall thickness of the first outer peripheral sidewall, the second outer peripheral sidewall, and the second inner peripheral sidewall.

For this reason, at the time of closing the door, the total wall thickness of the first outer peripheral sidewall, the second outer peripheral sidewall, and the second inner peripheral sidewall, which are interposed between the door frame or the door panel and the vehicle outside sidewall attached to the flange of the vehicle body opening peripheral edge, is larger than the gap between the vehicle outside sidewall and the door frame or the door panel, whereby the door closing force is not rapidly increased.

In a case where the distance between the door frame or the tip of the outer periphery of the door panel and the vehicle outside sidewall is less than 1.2 times the total thickness of the walls, there is a concern that the door closing force is increased according to, for example, the variation of the combination of the door frame or the door panel and the vehicle body opening peripheral edge. In a case where the distance between the door frame or the tip of the outer periphery of the door panel and the vehicle outside sidewall is larger than 2.5 times the total thickness of the walls, the sealing surface pressure applied when the tip portion of the second hollow portion abuts on the door frame or the tip of the outer periphery of the door panel is low, thereby reducing the sealability.

A third aspect of the invention provides the opening trim weather strip according to the first aspect or the second aspect, when the door frame of the vehicle door or the outer periphery of the door panel abuts on the hollow seal portion, a distance between the door frame of the vehicle door or the tip of the outer periphery of the door panel and an outer surface of the hollow seal portion bent portion is formed to be larger than a total wall thickness of the second outer peripheral sidewall and the second inner peripheral sidewall.

According to the third aspect of the invention, wherein when the door frame of the vehicle door or the door panel abuts on the hollow seal portion, the distance between the door frame of the vehicle door or the tip of the outer periphery of the door panel and the outer surface of the hollow seal portion bent portion is formed to be larger than the total wall thickness of the second outer peripheral sidewall and the second inner peripheral sidewall. For this reason, at the time of closing the door, even in consideration of the variation of the dimension of the door frame or the door panel, the total wall thickness of the second outer peripheral sidewall and the second inner peripheral sidewall, which are interposed between the door frame or the tip of the outer periphery of the door panel and the first outer peripheral sidewall, is smaller than the dimension between the position of the hollow seal portion bent portion and the door frame or the tip of the outer periphery of the door panel when the first outer peripheral sidewall is bent, whereby the door closing force is not increased.

A fourth aspect of the invention provides the opening trim weather strip according to any one of the first, second and third aspects, wherein a ratio of a length of the hollow seal portion connection wall to a length of the first outer peripheral sidewall is 1:1.57 to 1.82.

According to the fourth aspect of the invention, the ratio of a length of the hollow seal portion connection wall to a length of the first outer peripheral sidewall is 1:1.57 to 1.82. Therefore, at the time of closing the door, the first outer peripheral sidewall of the first hollow portion is easily deformed, whereby the door closing force is not increased. In addition, the hollow seal portion connection wall connecting the second hollow portion and the first hollow portion is narrow, whereby the second hollow portion is easily turned and deformed. In a case where the ratio is less than 1:1.57, the hollow seal portion connection wall is long. Therefore, the second hollow portion is not likely to turn and deform, and a deformation of pushing and crushing the second hollow portion causes the deformation load of the second hollow portion to increase, and causes the door closing force to increase. In a case where the ratio exceeds 1:1.82, the deformation of the second hollow portion is made not as a turning deformation, but as a bending deformation on the way in the longitudinal direction, the deformation load is increased, and the sealability between the tip portion of the second hollow portion and the door frame or the door panel is decreased.

A fifth aspect of the invention provides the opening trim weather strip according to any one of the first, second, third and fourth aspects, wherein a ratio of a distance between an outermost surface of the second outer peripheral sidewall and an outermost surface of the second inner peripheral sidewall to a distance from an upper surface of the hollow seal portion connection wall of the second hollow portion to a tip of the second hollow portion is 1:1.3 to 1.8.

According to the fifth aspect of the invention, the ratio of the distance between the outermost surface of the second outer peripheral sidewall and the outermost surface of the second inner peripheral sidewall to the distance from the upper surface of the hollow seal portion connection wall of the second hollow portion to the tip of the second hollow portion is 1:1.3 to 1.8. For this reason, the rigidity of the second hollow portion is ensured so that the door frame or the tip of the outer periphery of the door panel can abut on the tip portion of the second hollow portion in a linear seal manner at the time of closing the door, thereby making the sealing. In addition, the hollow seal portion is formed to be vertically long, the hollow seal portion connection wall connecting the second hollow portion and the first hollow portion is narrow, and thus the turning deformation of the second hollow portion is easily made.

In a case where the distance ratio is less than 1:1.3, the hollow seal portion is not vertically long, the deformation of the second hollow portion is made not as a turning deformation, but as a bending deformation on the way in the longitudinal direction, the deformation load is increased, and the door closing force is increased. In a case where the ratio exceeds 1:1.8, the deformation of the second hollow portion is made not as a turning deformation, but as a bending deformation on the way in the longitudinal direction, the deformation load is increased, and the sealability between the tip portion of the second hollow portion and the door frame or the door panel is decreased.

A sixth aspect of the invention provides the opening trim weather strip according to any one of the first, second, third, fourth and fifth aspects, wherein the second outer peripheral sidewall is curvedly formed in an arc shape in an outer direction of the second hollow portion.

According to the sixth aspect of the invention, the second outer peripheral sidewall is curvedly formed in an arc shape in the outer direction of the second hollow portion. Therefore, when the door frame or the tip of the outer periphery of the door panel presses the second hollow portion at the time of closing the door, the rapid increase of the load at the initial stage of the pressure can be prevented.

A seventh aspect of the invention provides the opening trim weather strip according to any one of the first, second, third, fourth, fifth and sixth aspects, wherein a portion of the second inner peripheral sidewall in vicinity of the tip of the second hollow portion is formed to be thicker than other portions of the second inner peripheral sidewall.

According to the seventh aspect of the invention, the portion of the second inner peripheral sidewall in vicinity of the tip of the second hollow portion is formed to be thicker than the other portion of the second inner peripheral sidewall. Therefore, the deformation of the second inner peripheral sidewall is prevented when the door frame or the door panel presses the second hollow portion, and thus the tip portion of the door frame or the door panel abuts on the tip portion of the second hollow portion in a linear seal manner at the time of closing the door, whereby the sealing surface pressure can be improved, and the sealing can be made.

A eighth aspect of the invention provides the opening trim weather strip according to any one of the first, second, third, fourth, fifth, sixth and seventh aspects, wherein the attaching base portion is formed in a substantially U shape in cross section configured by the vehicle outside sidewall, a vehicle inside sidewall, and a bottom wall.

According to the eighth aspect of the invention, the attaching base portion is formed in a substantially U shape in cross section configured by the vehicle outside sidewall, the vehicle inside sidewall, and the bottom wall. Therefore, the flange can be held in an inner portion of the substantially U shape in cross section, and be firmly interposed by a vehicle outside holding lip and a vehicle inside holding lip formed in the vehicle outside sidewall and the vehicle inside sidewall.

The first hollow portion includes the first outer peripheral sidewall obliquely extending in the vehicle outside direction from the opening end of the vehicle outside sidewall of the attaching base portion or in the center direction of the vehicle body opening peripheral edge. Therefore, when the first hollow portion abuts on the door frame or the door panel, the connector between the first outer peripheral sidewall of the first hollow portion and the hollow seal portion connection wall is positioned far from the vehicle outside sidewall connection surface so that the bending can be easily made, and thus the door closing force can be reduced.

The connector between the first outer peripheral sidewall and the second outer peripheral sidewall forms the hollow seal portion bent portion, and the hollow seal portion bent portion is formed to be positioned on the tip side of the flange from the tip portion of the second hollow portion. Therefore, the hollow seal portion is bent in the hollow seal portion bent portion at the time of closing the door so that the door closing force is reduced, and the tip portion of the second hollow portion abuts on the door frame or the door panel in a linear seal manner so that the sealability can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

An embodiment of the present invention will be described on the basis of FIGS. 1 to 4.

As illustrated in FIG. 3, a vehicle body 1 includes a door opening portion, and the door opening portion is opened and closed by a door as an opening/closing member. A vehicle body opening peripheral edge 6 is formed on the edge of the door opening portion, and the vehicle body opening peripheral edge 6 includes a flange 7 (see FIG. 1) obtained by welding tips of an outer panel 9, an inner panel 8, and the like which form the vehicle body 1. The number of welded panels in the flange 7 is varied from two sheets to eight sheets depending on the position of the vehicle body opening peripheral edge 6 of the vehicle body 1.

Sealing a gap between the door and the vehicle body opening peripheral edge 6 is made by a glass run (not illustrated) which is attached to a channel of the door for sealing a gap between a door glass 5 and the inner periphery of a door frame 2, an opening weather strip (not illustrated) for sealing the opening side of the vehicle body opening peripheral edge 6, and an opening trim weather strip 10 which is attached to the flange 7 for sealing the inner side of the vehicle than the opening weather strip.

The present invention relates to the opening trim weather strip 10. The opening trim weather strip 10 is formed in a straight line shape by extrusion molding. The opening trim weather strip 10 formed as one unit in the straight line shape is mounted in the flange 7 to have an annular shape along the shape of the vehicle body opening peripheral edge 6 as illustrated in FIG. 4.

The mounting is performed in such a manner that the opening trim weather strip 10 is mounted in sequence from one end thereof in the flange 7, and after completing the mounting, the other end is bonded with the one end. The ends may be mold-bonded by a connector 11 to be formed in the annular shape.

The ends of the opening trim weather strip 10 may adhere to each other with an adhesive before the mounting to be formed in the annular shape.

Figure 1:
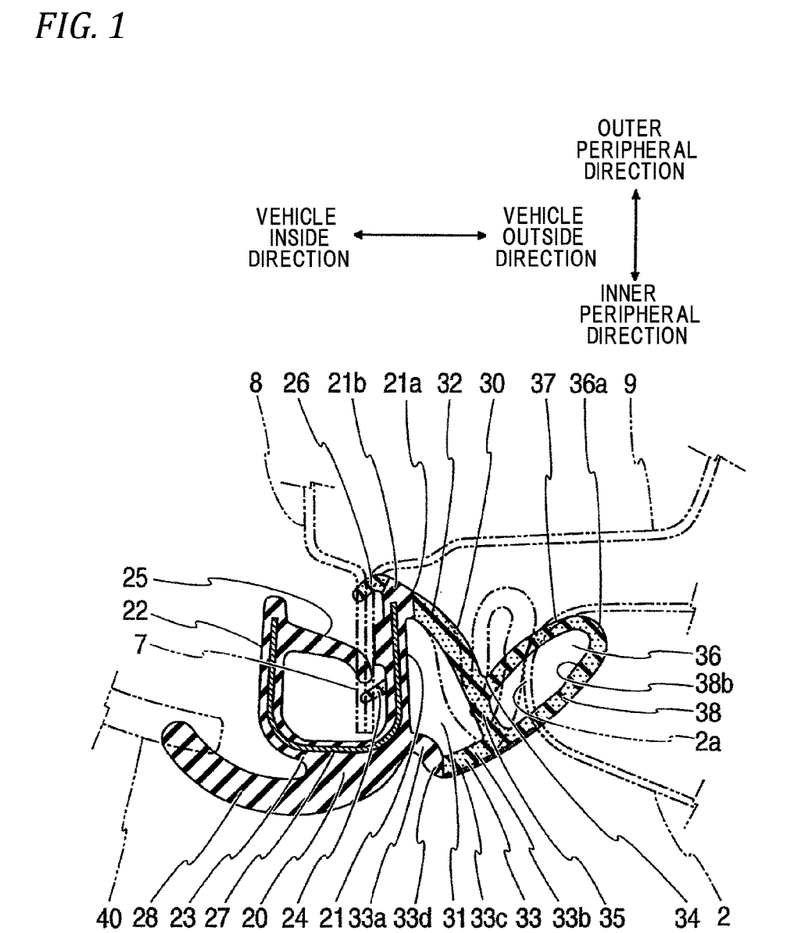
FIG. 1 is a sectional view when taken along line A-A in FIG. 4, illustrating a state where an opening trim weather strip according to an embodiment of the present invention is attached to a flange.
Figure 2:
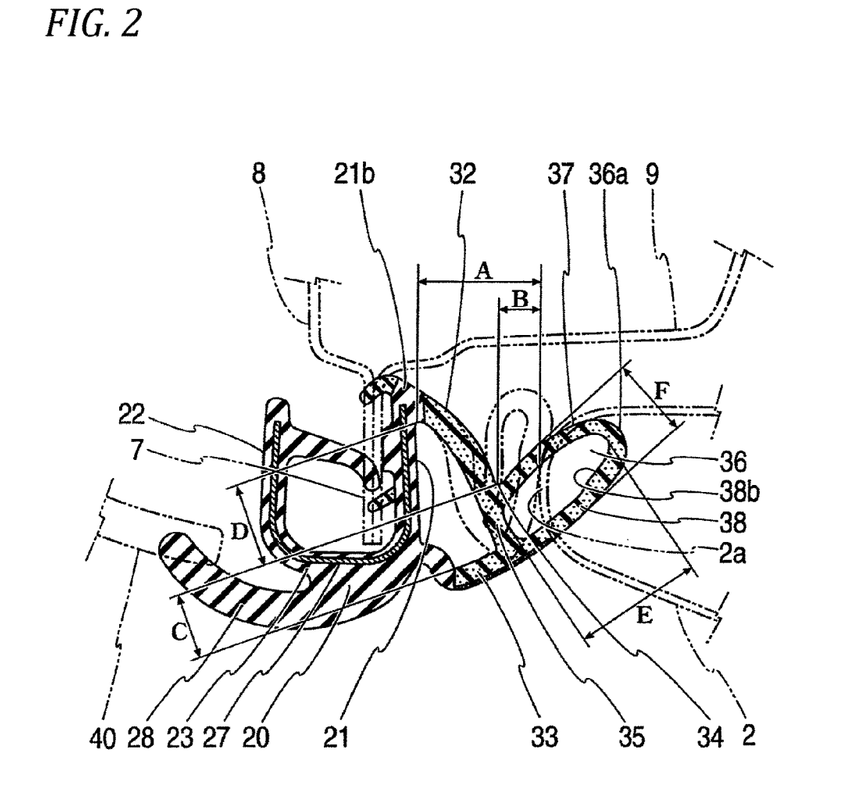
FIG. 2 is a sectional view illustrating a state where the opening trim weather strip according to the embodiment of the present invention is attached to the flange, and illustrates a dimension relation in FIG. 1.

As illustrated in FIGS. 1 and 2, the opening trim weather strip 10 includes a trim portion (attaching base portion) 20 which is attached to the flange 7 and has a substantially U shape in cross section, and a hollow seal portion 30 of a hollow shape which is formed integrally with the trim portion 20, and serves as a sealing portion which abuts on a door frame protrusion 2a of the door frame 2 to seal a gap between the door and the vehicle body opening peripheral edge 6.

The embodiment of the present invention will be described by using the opening trim weather strip 10 abutting on the door frame 2 as an example.

According to the present invention, the hollow seal portion 30 is integrally provided on the outer surface of a vehicle outside sidewall 21 of the trim portion 20. The hollow seal portion 30 will be described below.

In FIGS. 1 and 2, a left direction illustrated in FIG. 1 indicates a vehicle inside direction, and a right direction in FIG. 1 indicates a vehicle outside direction. An upper direction of FIG. 1 indicates an outer peripheral direction of the vehicle body opening peripheral edge 6, and a lower direction of FIG. 1 indicates an inner peripheral direction of the vehicle body opening peripheral edge 6. The outer peripheral direction of the vehicle body opening peripheral edge 6 is an opposite direction of the vehicle body opening peripheral edge 6, which is an opening of the vehicle body as illustrated in FIG. 3, to the center of the opening. The inner peripheral direction of the vehicle body opening peripheral edge 6 is a center direction of the opening of the vehicle body opening peripheral edge 6. The flange 7 formed in the vehicle body opening peripheral edge 6 is directed to the center direction of the opening, and thus a tip direction of the flange 7 is the inner peripheral direction, and a root direction of the flange 7 is the outer peripheral direction.

The upper, lower, right, and left directions of the outer peripheral direction and the inner peripheral direction are varied depending on the position of the vehicle body opening peripheral edge 6 of the vehicle body. In the upper portion of the vehicle body opening peripheral edge 6, the outer peripheral direction is the upper direction, and the inner peripheral direction is the lower direction. In the lower portion of the vehicle body opening peripheral edge 6, the outer peripheral direction is the lower direction, and the inner peripheral direction is the upper direction.

The trim portion 20 serving as an attaching base portion includes the vehicle outside sidewall 21, a vehicle inside sidewall 22, and a bottom wall 23, and is formed in the substantially U shape in cross section. An insert member 27 is embedded in the trim portion 20 so as to improve the strength for gripping the flange 7. The insert member 27 is formed of a sheet metal or a hard resin, and is formed in a ladder shape, a fish bone shape, a zigzag shape or the like so as to ensure flexibility required when being attached in corner portions. The trim portion 20 is formed of a solid material or a finely-foamed material.

A vehicle outside holding lip 24 and a vehicle inside holding lip 25, which extend in a longitudinal direction and sandwich the flange 7 therebetween, are formed on the inner surfaces of the vehicle outside sidewall 21 and the vehicle inside sidewall 22, respectively. For this reason, the tips of the vehicle outside holding lip 24 and the vehicle inside holding lip 25 abuts on the respective both side surfaces of the flange 7, thereby firmly holding the flange 7. For this reason, the trim portion 20 is not tilted, and the hollow seal portion 30 reliably abuts on the door frame 2, whereby the sealability can be ensured.

The vehicle inside holding lip 25 according to this embodiment is formed as one unit to be long. For this reason, the vehicle inside holding lip 25 can stably hold the flange 7 in such a manner that the vehicle inside holding lip 25 is bent to press the flange 7 toward the vehicle outside sidewall 21 even when the thickness of the flange 7 is changed. The tip of the vehicle inside holding lip 25 is formed to be bent toward the bottom wall 23 so that it is easy to hold the flange 7.

The vehicle outside holding lip 24 according to this embodiment is formed as one unit to be short after extrusion molding, and the vehicle inside holding lip 25 is formed as one unit to be long and protrudes in an oblique direction to the inner portion of a substantially U shape in cross section. For this reason, the flange 7 is positioned on the inner side of the vehicle outside sidewall 21, and is held by the vehicle outside holding lip 24. In addition, the vehicle outside holding lip 24 and the vehicle inside holding lip 25 reliably follow the unevenness or bending of the flange 7 to abut on the flange 7, whereby the sealability can be ensured.

A cover lip 28 extends in a vehicle inward direction from a continuous portion of the vehicle inside sidewall 22 and the bottom wall 23, and covers a tip of a garnish 40 attached in the vehicle.

A vehicle outside seal lip 26 configured to abut on the flange 7 is provided in the tip of the vehicle outside sidewall 21. For this reason, as illustrated in FIG. 1, when the trim portion 20 is attached to the flange 7, the vehicle outside seal lip 26 abuts on the root portion of the flange 7 to cover a gap between the outer panel 9 and the vehicle outside sidewall 21. Therefore, rainwater flowing in through the outer panel 9 can be prevented from entering the vehicle through between the outer panel 9 and the vehicle outside sidewall 21.

Next, the hollow seal portion 30, which serves as a sealing portion, according to the embodiment of the present invention will be described on the basis of FIGS. 1 and 2.

According to the embodiment of the present invention, the hollow seal portion 30 includes two hollow portions, and the hollow seal portion 30 is formed to be divided into a first hollow portion 31 extending from the trim portion 20 and a second hollow portion 36 abutting on the door frame 2 or the outer periphery of a door panel by a hollow seal portion connection wall 35.

The hollow seal portion 30 is preferably formed of a sponge material having a specific gravity of 0.5 to 0.7. In this case, the hollow seal portion 30 has flexibility, and thus can be abutted to follow the variation of the door frame 2 of a vehicle door, whereby the sealability with the door frame 2 can be ensured. Further, the overall weight of the opening trim weather strip 10 is reduced to contribute to a reduction in weight of the vehicle.

The first hollow portion 31 and the second hollow portion 36 can be formed in different shape in cross section, and the first hollow portion 31 and the second hollow portion 36 can have different deformation rigidity. For this reason, the first hollow portion 31 is easy to bend, and a tip portion 36a of the second hollow portion 36 (to be described below) abuts on the door frame 2 or the outer periphery of the door panel at a predetermined surface pressure in a linear seal manner, whereby the sealability can be ensured.

The first hollow portion 31 includes a first outer peripheral sidewall 32 obliquely extending in the vehicle outside direction from the end of the opening, which has the substantially U shape in cross section, of the vehicle outside sidewall 21 of the trim portion 20, or in the inner peripheral direction of the vehicle body opening peripheral edge 6 (an oblique direction to a left and lower side in FIG. 1), the hollow seal portion connection wall 35 extending in an extending direction of the first outer peripheral sidewall 32, a first inner peripheral sidewall 33 connected to the end of the hollow seal portion connection wall 35 from the bottom wall side of the vehicle outside sidewall 21 of the trim portion 20, and the vehicle outside sidewall 21 of the trim portion 20. The first outer peripheral sidewall 32 extends from a vehicle outside sidewall connection surface 21a positioned at the tip of a vehicle outside sidewall extension portion 21b of the vehicle outside sidewall 21.

In this embodiment, the first inner peripheral sidewall 33 includes a first inner peripheral sidewall holding portion 33a extending from the vehicle outside sidewall 21, and a first inner peripheral sidewall body 33b extending from the first inner peripheral sidewall holding portion 33a. A first inner peripheral sidewall skin layer 33c formed of a solid material is provided on the outer surface of the first inner peripheral sidewall body 33b. For this reason, the surface becomes smooth to improve the appearance thereof.

The first inner peripheral sidewall holding portion 33a is formed of a solid material similarly with the vehicle outside sidewall 21, and the first inner peripheral sidewall body 33b is formed of a sponge material. The first inner peripheral sidewall holding portion 33a is connected to the first inner peripheral sidewall body 33b through the first inner peripheral sidewall connection surface 33d. The first inner peripheral sidewall holding portion 33a is formed to be bent gradually in the inner peripheral direction.

The second hollow portion 36 includes a second outer peripheral sidewall 37 extending from a hollow seal portion bent portion 34 serving as a connector between the first outer peripheral sidewall 32 and the hollow seal portion connection wall 35 to the outer peripheral side of the vehicle body opening peripheral edge 6, and a second inner peripheral sidewall 38 formed to be positioned from a connector between the first inner peripheral sidewall 33 and the hollow seal portion connection wall 35 in the inner peripheral direction of to the second outer peripheral sidewall.

The tip of the second outer peripheral sidewall 37 and the tip of the second inner peripheral sidewall 38 are connected with each other to form the tip portion 36a of the second hollow portion 36. The second outer peripheral sidewall 37 and the second inner peripheral sidewall 38 are formed in an arc shape, and thus the second hollow portion 36 is formed in an oval shape in cross section. For this reason, when the door frame 2 or the door panel abuts on the tip portion 36a of the second hollow portion 36, the second hollow portion 36 has the deformation resistance so that the tip portion 36a abuts thereon in a linear seal manner to ensure the sealing surface pressure, whereby the sealability can be improved.

The first outer peripheral sidewall 32 and the hollow seal portion connection wall 35 are continuous in an arc shape, and thus the first hollow portion 31 has a substantially triangular shape in cross section. When the door frame 2 or the door panel abuts on the opening trim weather strip 10, the hollow seal portion bent portion 34 serving as the connector between the first outer peripheral sidewall 32 of the first hollow portion 31 and the hollow seal portion connection wall 35 is squeezed by the second outer peripheral sidewall 37 of the second hollow portion 36.

At this time, the hollow seal portion bent portion 34 is positioned far from the vehicle outside sidewall connection surface 21a which restrains the deformation of the first outer peripheral sidewall 32, and thus, a deformation movement is easily made to contribute the reduction of a door closing force.

The first outer peripheral sidewall 32 does not have a folded-back portion between the vehicle outside sidewall connection surface 21a and the hollow seal portion bent portion 34, and thus, an allowance until a bottom touch occurs due to an overlap of the sidewalls is large even when the hollow seal portion 30 is largely deformed.

The second outer peripheral sidewall 37 is curvedly formed in an arc shape in the outer peripheral direction of the second hollow portion 36. Thus, when the door frame 2 or the door panel presses the second hollow portion 36 at the time of closing the door, the hollow seal portion bent portion 34 is squeezed while the shape of the second outer peripheral sidewall 37 itself is maintained. Therefore, in the initial stage of the pressure, the second hollow portion 36 is deformed due to a transition behavior or a rotation so that it can be suppressed that the door closing force increases.

In the second inner peripheral sidewall 38, a thick portion 38b formed to be thicker than the other portion of the second inner peripheral sidewall 38 is preferably formed in vicinity of the tip portion 36a of the second hollow portion 36. In this case, when the door frame 2 or the door panel presses the second hollow portion 36, the deformation of the second inner peripheral sidewall 38 is prevented. Therefore, when the tip portion 36a of the second hollow portion 36 abuts on the door frame 2 or the door panel at the time of closing the door, the sealing surface pressure is improved, whereby it is possible to make the sealing by abutting in a linear seal manner.

A connector between the first outer peripheral sidewall 32 and the second outer peripheral sidewall 37 forms the hollow seal portion bent portion 34, and the outer surface of the hollow seal portion bent portion 34 is formed to be positioned in the inner peripheral direction of the vehicle body opening peripheral edge 6 than the tip portion 36a of the second hollow portion 36. That is, in FIG. 1, the hollow seal portion bent portion 34 is positioned below the tip portion 36a of the second hollow portion 36.

For this reason, when the door frame 2 or the door panel abuts on the tip portion 36a of the second hollow portion 36 at the time of closing the door, the second hollow portion 36 is bent in the hollow seal portion bent portion 34, and thus the hollow seal portion 30 can be easily bent. Therefore, it is possible to reduce the door closing force. In addition, the tip portion 36a of the second hollow portion 36 abuts on the door frame 2 or the door panel in a linear seal manner, whereby the sealability can be improved.

When the door frame protrusion 2a of the door frame 2 or the outer periphery of the door panel abuts on the hollow seal portion 30 at the time of closing the vehicle door, a distance between the door frame protrusion 2a of the door frame 2 of the vehicle door or the tip of the outer periphery of the door panel and the vehicle outside sidewall connection surface 21a between the first outer peripheral sidewall 32 and the vehicle outside sidewall 21 (a distance indicated by A in FIG. 2) is preferably formed in a length of 1.2 to 2.5 times the total wall thickness of the first outer peripheral sidewall 32, the second outer peripheral sidewall 37, and the second inner peripheral sidewall 38.

In this case, at the time of closing the door, the first outer peripheral sidewall 32, which is interposed between the door frame protrusion 2a of the door frame 2 or the outer periphery of the door panel and the vehicle outside sidewall 21 attached to the flange 7 of the vehicle body opening peripheral edge 6, the second outer peripheral sidewall 37, and the second inner peripheral sidewall 38 do not increase the door closing force.

In a case where a distance between the door frame protrusion 2a of the door frame 2 or the tip of the outer periphery of the door panel and the vehicle outside sidewall connection surface 21a (a distance indicated by A in FIG. 2) is less than 1.2 times the total thickness of the walls, there is a concern that the door closing force is rapidly increased according to, for example, the variation of the combination of the door frame 2 or the door panel and the flange 7 of the vehicle body opening peripheral edge 6.

In a case where the distance between the door frame protrusion 2a of the door frame 2 or the tip of the outer periphery of the door panel and the vehicle outside sidewall connection surface 21a is larger than 2.5 times the total thickness of the walls, the sealing surface pressure is low when the tip portion 36a of the second hollow portion abuts on the door frame 2 or the tip of the outer periphery of the door panel, thereby reducing the sealability.

When the door frame protrusion 2a of the door frame 2 or the outer periphery of the door panel abuts on the hollow seal portion 30 at the time of closing the door, the distance between the door frame protrusion 2a or the tip of the outer periphery of the door panel and the outer surface of the hollow seal portion bent portion 34 (the distance indicated by B in FIG. 2) is preferably formed to be larger than the total wall thickness of the second outer peripheral sidewall 37 and the second inner peripheral sidewall 38. In this case, at the time of closing the door, the second outer peripheral sidewall 37 and the second inner peripheral sidewall 38, which are interposed between the door frame protrusion 2a of the door frame 2 or the door panel and the first outer peripheral sidewall 32, suppresses the rapid increase of the door closing force.

A ratio of the length of the hollow seal portion connection wall 35 (a distance indicated by C in FIG. 2) to the length of the first outer peripheral sidewall 32 (a distance indicated by D in FIG. 2) is preferably 1:1.57 to 1.82. In this case, when the door frame protrusion 2a or the tip of the outer periphery of the door panel abuts on the hollow seal portion 30 at the time of closing the door, the distance between the hollow seal portion bent portion 34 and the vehicle outside sidewall connection surface 21a is long. Thus, a squeeze deformation of the hollow seal portion bent portion 34 is easily made, and further the second hollow portion 36 can easily transition by shortening the length of the hollow seal portion connection wall 35, whereby a door opening force is suppressed by a synergistic effect of the two effect.

A ratio of the distance between the outermost surface of the second outer peripheral sidewall 37 and the outermost surface of the second inner peripheral sidewall 38 (a distance indicated by F in FIG. 2) to the distance from the upper surface of the hollow seal portion connection wall 35 of the second hollow portion 36 to the tip portion 36a of the second hollow portion 36 (a distance indicated by E in FIG. 2) is preferably 1:1.3 to 1.8.

In this case, the rigidity of the second hollow portion 36 is ensured so that the door frame protrusion 2a of the door frame 2 or the outer periphery of the door panel and the second hollow portion 36 can abut on each other in a linear seal manner to make the sealing at the time of closing the door. In a case where a ratio of the above-described distance is smaller than 1:1.3, it is not easy to be deformed in a transition manner, and thus the second hollow portion 36 is easy to deform in a crushing manner by the door frame 2 or the door panel. By a crushing deformation of the entire hollow seal portion 30, the sealability decreases as well as the door closing force increases. In a case where the ratio is larger than 1:1.8, the second hollow portion 36 itself is easy to deform in a bending manner, and the door closing force is increased or the sealability is decreased.

Next, the description will be given about the producing method of the opening trim weather strip 10.

The opening trim weather strip 10 is molded by extrusion molding. A solid rubber or a fine-foamed material forming the trim portion 20, and a sponge rubber forming the insert member 27 and the hollow seal portion 30 can be integrally extruded by an extrusion molding machine.

After that, vulcanization is performed by a conventional method, and then the opening trim weather strip is cut into a predetermined length corresponding to one unit.

What is claimed is:

1. An opening trim weather strip which is attached to a flange formed to surround a vehicle body opening peripheral edge of a vehicle and seals a gap between a vehicle door and the vehicle body opening peripheral edge, comprising:
   an attaching base portion attached to the flange; and
   a hollow seal portion which is integrally provided to the attaching base portion and abuts on a door frame of the vehicle door or a door panel to seal the gap between the vehicle door and the vehicle body opening peripheral edge, wherein:
   the hollow seal portion is formed to be divided into a first hollow portion extending from the attaching base portion and a second hollow portion abutting on the door frame or an outer periphery of the door panel by a hollow seal portion connection wall;
   the first hollow portion includes: a first outer peripheral sidewall obliquely extending from an opening end of a vehicle outside sidewall of the attaching base portion in a vehicle outside direction and in an inner peripheral direction of the vehicle body opening peripheral edge; the hollow seal portion connection wall extending in an extending direction of the first outer peripheral sidewall; a first inner peripheral sidewall connected from a bottom wall side of the vehicle outside sidewall of the attaching base portion to a tip of the hollow seal portion connection wall; and the vehicle outside sidewall of the attaching base portion;
   the first outer peripheral sidewall and the hollow seal portion connection wall are continuous in an arc shape;
   the second hollow portion includes a second outer peripheral sidewall extending from a first connector between the first outer peripheral sidewall and the hollow seal portion connection wall to an outer peripheral side of the vehicle body opening peripheral edge, and a second inner peripheral sidewall formed to be positioned from a second connector between the first inner peripheral sidewall and the hollow seal portion connection wall in an inner peripheral direction of the second outer peripheral sidewall, and tips of the second outer peripheral sidewall and the second inner peripheral sidewall are connected to each other to form a tip portion of the second hollow portion;
   a third connector between the first outer peripheral sidewall and the second outer peripheral sidewall forms a hollow seal portion bent portion, and an outer surface of the hollow seal portion bent portion is formed to be positioned in the inner peripheral direction of the vehicle body opening peripheral edge than the tip portion of the second hollow portion,
   a distance between the door frame of the vehicle door or a tip of the outer periphery of the door panel and a connection surface between the first outer peripheral sidewall and the vehicle outside sidewall is formed in a length of 1.2 to 2.5 times a total wall thickness of the first outer peripheral sidewall, the second outer peripheral sidewall, and the second inner peripheral sidewall when the door frame of the vehicle door or the door panel abuts on the hollow seal portion;
   a ratio of a length of the hollow seal portion connection wall to a length of the first outer peripheral sidewall is 1:1.57 to 1.82;
   a ratio of a distance between an outermost surface of the second outer peripheral sidewall and an outermost surface of the second inner peripheral sidewall to a distance from an upper surface of the hollow seal portion connection wall of the second hollow portion to a tip of the second hollow portion is 1:1.3 to 1.8; and
   the first outer peripheral sidewall of the first hollow portion of the hollow seal portion, which is formed of a sponge material, extends from the opening end of the vehicle outside sidewall, which is formed of a solid material, and the first hollow portion has a substantially triangular shape in a cross section that includes the first outer peripheral sidewall, the hollow seal portion connection wall, the first inner peripheral sidewall, and the vehicle outside sidewall of the attaching base portion.

2. The opening trim weather strip according to claim 1, wherein
   when the door frame of the vehicle door or the outer periphery of the door panel abuts on the hollow seal portion, a distance between the door frame of the vehicle door or the tip of the outer periphery of the door panel and an outer surface of the hollow seal portion bent portion is formed to be larger than a total wall thickness of the second outer peripheral sidewall and the second inner peripheral sidewall.

3. The opening trim weather strip according to claim 1, wherein
   the second outer peripheral sidewall is curvedly formed in an arc shape in an outer direction of the second hollow portion.

4. The opening trim weather strip according to claim 1, wherein
   a portion of the second inner peripheral sidewall in vicinity of the tip of the second hollow portion is formed to be thicker than other portions of the second inner peripheral sidewall.

5. The opening trim weather strip according to claim 1, wherein
   the attaching base portion is formed in a substantially U shape in cross section configured by the vehicle outside sidewall, a vehicle inside sidewall, and a bottom wall.

6. The opening trim weather strip according to claim 1, wherein
   the first outer sidewall extends directly from a connection surface located on the vehicle outside sidewall.

\* \* \* \* \*